Figure 1:
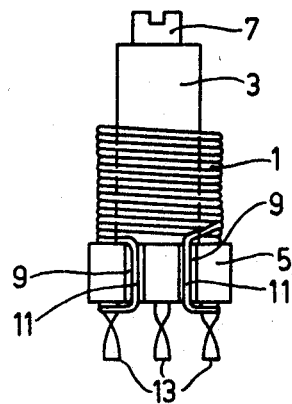

United States Patent [19]
DeGroot

[11] 3,735,307
[45] May 22, 1973

[54] COIL SUPPORT

[75] Inventor: Jacob DeGroot, Emmasingel, Eindhoven, Netherlands

[73] Assignee: U.S. Phillips Corporation, New York, N.Y.

[22] Filed: Sept. 24, 1971

[21] Appl. No.: 183,451

[30] Foreign Application Priority Data

Oct. 3, 1970 Netherlands ..................... 7014556

[52] U.S. Cl. ............... 336/192, 336/107, 336/198, 339/220 C, 339/221 M
[51] Int. Cl. ............................................ H01j 15/10
[58] Field of Search ............... 339/220 R, 220 C, 339/220 T, 221 R, 221 M; 336/192, 198, 208, 107; 317/242, 101 C

[56] References Cited
UNITED STATES PATENTS 2,483,801   10/1949   Becwar ....................... 336/192 X
3,223,900   12/1965   Wittwer ....................... 317/242 X Primary Examiner—E. A. Goldberg
Attorney—Frank R. Trifari

[57] ABSTRACT

A support made of a thermoplastic synthetic resin, for an electrical component, such as a coil, having a base with cylindrical apertures in which connecting pins are inserted. The pins comprise strips of twisted metal the width of which is equal to the diameter of the apertures.

2 Claims, 2 Drawing Figures

INVENTOR.
JACOB DE GROOT

COIL SUPPORT

The invention relates to a support of a thermoplastic synthetic resin for an electrical component, particularly a coil. The support is the type having a base which is provided with apertures in which solderable connecting pins are inserted. Supports of this kind are preferably used for manufacturing coils which are suitable for soldering into a printed circuit. Such a support usually consists of a circular-cylindrical portion on which the coil is wound. This portion is formed from thermoplastic synthetic resin as one assembly with the base. After the coil has been wound, the ends of the coil wire are soldered to the connecting pins. A drawback thereof is that the connecting pins transfer heat to the synthetic resin during soldering, so that the latter becomes soft, thus causing the pins to work loose or change their alignment.

The object of the invention is to provide a construction considerably eliminating this drawback. According to the invention, this object is achieved by providing connecting pins which consist of a strip of conducting material, twisted over at least the portion of its length which engage the aperture. The apertures are round holes, the diameter of which is approximately equal to the width of the strips.

In this construction the transfer of heat to the synthetic resin is reduced because the cross-section of the twisted strip is considerably smaller than that of a round pin which fits in the same hole, and the contact area between the connecting pin and the synthetic resin is reduced from the entire inner wall of the aperture to a double helical line.

A reduction of the heat transfer might also be achieved by using a non-twisted strip-shaped pin instead of a round pin, but this solution is objectionable because such a pin is poorly secured in a direction perpendicular to the plane of the strip, i.e. preventing the pin from assuming a position other than the desired position. By twisting the portion of the pin engaging the aperture, preferably over at least 90°, the pin is secured in all directions. The twisted shape offers the additional advantage that, in the event the synthetic resin along the contact line with the pin should happen to become soft anyway, a helical groove would be produced in the synthetic resin so that the pin will not drop out of the aperture, but remains screwed in.

Figure 2:
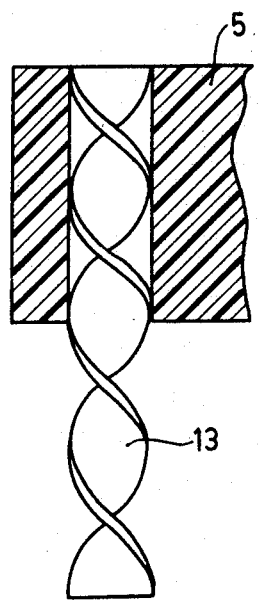

In order that the invention may be readily carried into effect, one embodiment thereof will now be described in detail, by way of example, with reference to the accompanying diagrammatic drawing, in which:

FIG. 1 is a side view of a coil which is wound on a support according to the invention, and FIG. 2 shows a longitudinal section on an enlarged scale through a portion of the support of FIG. 1 which is important for the invention.

The coil shown in FIG. 1 is wound on a circular-cylindrical former 3, which forms a support together with a base 5. The coil former 3 can accommodate a ferro-magnetic core 7 which is to be screwed in for adjusting the inductance of the coil.

In the base 5 are recessed grooves 9 which extend in FIG. 1 from the upper edge to the lower edge of the base and in which the wire ends 11 of the coil 1 extend, said wire ends 11 being soldered to connecting pins 13. As is shown in FIG. 2, each connecting pin 13 consists of a twisted strip-shaped conductor which is inserted into a round aperture in the base 5, the diameter of said aperture being approximately equal to the width of the strip. By twisting the connecting pin over its entire length as shown in FIG. 2, it is possible to feed a long strip of material continuously through a twisting device and to subsequently cut connecting pins of the desired length. This is less expensive than the twisting of each connecting pin individually.

What is claimed is:

1. A support for an electrical component comprising a support member, a base carrying said support member, said support member and said base being made of a thermoplastic synthetic resinous material, a plurality of circular apertures provided in said base, a solderable connecting pin inserted in each of said apertures comprising a strip of conducting material twisted at least through 90° and over at least that portion of its length which engages said aperture, the diameter of said circular apertures being approximately equal to the width of said strips forming the connecting pins so that the edges thereof are in contact with the inner surface of said apertures.

2. The support according to claim 1 wherein said strip is uniformly twisted over its entire length.

* * * * *